(12) United States Patent
Park et al.

(10) Patent No.: US 8,861,879 B2
(45) Date of Patent: Oct. 14, 2014

(54) METHOD AND APPARATUS FOR ENCODING AND DECODING IMAGE BASED ON SKIP MODE

(75) Inventors: Sung-bum Park, Seongnam-si (KR); Jung-woo Kim, Seoul (KR); Dai-woong Choi, Seoul (KR); Jae-won Yoon, Seoul (KR); Jun-ho Cho, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 12/883,807

(22) Filed: Sep. 16, 2010

(65) Prior Publication Data

US 2011/0064325 A1    Mar. 17, 2011

Related U.S. Application Data

(60) Provisional application No. 61/243,216, filed on Sep. 17, 2009, provisional application No. 61/243,218, filed on Sep. 17, 2009, provisional application No. 61/244,139, filed on Sep. 21, 2009, provisional application No. 61/257,609, filed on Nov. 3, 2009.

(51) Int. Cl.

| G06K 9/36 | (2006.01) |
|---|---|
| G06K 9/46 | (2006.01) |
| H04N 19/174 | (2014.01) |
| H04N 19/103 | (2014.01) |
| H04N 19/176 | (2014.01) |
| H04N 19/132 | (2014.01) |
| H04N 19/46 | (2014.01) |
| H04N 19/13 | (2014.01) |
| H04N 19/60 | (2014.01) |
| H04N 19/34 | (2014.01) |

(52) U.S. Cl.
CPC ... *H04N 19/00127* (2013.01); *H04N 19/00272* (2013.01); *H04N 19/00018* (2013.01); *H04N 19/00121* (2013.01); *H04N 19/00278* (2013.01); *H04N 19/00775* (2013.01); *H04N 19/00442* (2013.01); *H04N 19/00545* (2013.01)
USPC .......................................................... 382/239

(58) Field of Classification Search
USPC .................................................. 382/232, 239
See application file for complete search history.

(56) References Cited

U.S. PATENT DOCUMENTS

| 6,707,939 B1 * | 3/2004 | Weinholz et al. ............. 382/164 |
|---|---|---|
| 7,903,873 B2 | 3/2011 | Lu et al. |

(Continued)

FOREIGN PATENT DOCUMENTS

| CN | 1 01 321 287 A | 12/2008 |
|---|---|---|
| CN | 101415115 A | 4/2009 |

(Continued)

OTHER PUBLICATIONS

Tanizawa, Akiyuki, et al., "Fast Rate-Distortion Optimized Coding Mode Decision for H.264", Electronics & Communications in Japan, Part III—Fundamentalelectronic Science, Wiley, Hoboken, NJ, US, Jan. 1, 2007, vol. 90, No. 9, pp. 41-55.

(Continued)

*Primary Examiner* — Bernard Krasnic
(74) *Attorney, Agent, or Firm* — Sughrue Mion, PLLC

(57) ABSTRACT

An image encoding method and apparatus, and an image decoding method and apparatus respectively corresponding to the image encoding method and apparatus are provided. The image encoding method includes: if a current block is an initial block of a current slice, determining whether a virtual block in which pixel values are equal to a predetermined value is identical to the current block; and encoding the current block in a first mode based on the determining, wherein the first mode is a mode for encoding information representing that the current block is encoded in the first mode, instead of encoding pixel values of the current block, when the current block is identical to the virtual block.

21 Claims, 11 Drawing Sheets

(56) References Cited

U.S. PATENT DOCUMENTS

| | | | |
|---|---|---|---|
| 8,750,377 B2 | 6/2014 | Divorra Escoda et al. | |
| 8,763,949 B2 | 7/2014 | Thomassey | |
| 2003/0113026 A1 | 6/2003 | Srinivasan et al. | |
| 2003/0169932 A1 | 9/2003 | Li et al. | |
| 2005/0117640 A1* | 6/2005 | Han | 375/240.03 |
| 2005/0135484 A1 | 6/2005 | Lee et al. | |
| 2005/0190977 A1* | 9/2005 | Jeon et al. | 382/239 |
| 2007/0030911 A1 | 2/2007 | Yoon | |
| 2007/0133677 A1 | 6/2007 | Han et al. | |
| 2007/0160137 A1 | 7/2007 | Guo et al. | |
| 2008/0112481 A1 | 5/2008 | Hsaing et al. | |
| 2008/0130990 A1 | 6/2008 | Moriya et al. | |
| 2010/0046628 A1* | 2/2010 | Bhaskaran et al. | 375/240.24 |
| 2010/0220791 A1 | 9/2010 | Lin et al. | |
| 2010/0309984 A1* | 12/2010 | Liu et al. | 375/240.24 |

FOREIGN PATENT DOCUMENTS

| | | |
|---|---|---|
| CN | 101448162 A | 6/2009 |
| KR | 1999-0080293 A | 11/1999 |
| WO | 2007/069829 A1 | 6/2007 |
| WO | 2008/127597 A2 | 10/2008 |
| WO | 2009/036255 A2 | 3/2009 |
| WO | 2011027256 A1 | 3/2011 |

OTHER PUBLICATIONS

Laroche, Guillaume, et al., "RD Optimized Coding for Motion Vector Predictor Selection", IEEE Transactions on Circuits and Systems for Video Technology, IEEE Service Center, Piscataway, NJ, US, Dec. 1, 2008, vol. 17, No. 12, pp. 1681-1691.
Yanagihara, Naofumi, et al., "A Video Coding Scheme With a High Compression Ratio for Consumer Digital VCRs", Consumer Electronics, 1993, Digest of Technical Papers ICCE., International Conference on Rosemont, IL, Jun. 8-10, 1993, pp. 22-23.
Sjoberg, Rickard, et al., "Run-length Coding of Skipped Macroblocks", Itu Study Group 16—Video Coding Experts, Apr. 2, 2001, pp. 1-5.
Bjontegaard, Gisle, et al., "Use of Run-length Coding to Identify Coded Macroblocks", 13 VCEG Meeting, Apr. 2-4, 2001, Austin, TX, Videocoding Experts Goup of ITU-T SG.16, No. VCEG-M29, pp. 1-3.
Sullivan, Gary, et al., Meeting Report of the Thirteenth Meeting (Meeting M) of the ITU-T Q.6/16 Video Coding Experts Group (VCEG)—Austin, TX, Apr. 2-4, 2001, No. VCEG-M82d1, Jun. 15, 2001, 34 pages total.
Schwarz, Heiko, et al., "Skip Mode for SVC Slice Data Syntax", 19. JVT Meeting; Mar. 31-Apr. 7, 2006 Geneva, CH; (Joint Videoteam of ISO/IEC JTC1/SC9/WG11 and ITU-T SG.16), No. JVT-S068, Mar. 31, 2006, pp. 1-7.
Zeng, Wenjun, et al., "Rate Shaping by Block Dropping for Transmission of MPEG-precoded Video over Channels of Dynamic Bandwith", Proceedings of ACM Multimedia 96. Boston, Nov. 18-22, 1996, New York, ACM, Nov. 18, 1996, pp. 385-393.
Jo, Youngsub, et al., "Fast Mode Decision Algorithm Using Efficient Block Skip Techniques for H.264 P Slices", Advances in Multimedia, 2009. MMEDIA '09. First International Conference on IEEE, Piscataway, NJ. Jul. 20, 2009, pp. 92-97.
Lee, Bumshik, et al., "SVC NAL Unit Types for Online Extraction", 21. JVT Meeting; 78. MPEG Meeting; Oct. 20-27, 2006; Hangzhou, CN; (Joint Video Team of ISO/IEC JTC1/SC29/WG11 and ITU-T SG. 16), No. JVT-U080, Oct. 22, 2006, pp. 1-9.
Communication dated Feb. 1, 2013 issued by the European Patent Office in counterpart European Application No. 10817451.7.
Communication dated Mar. 5, 2013 issued by the European Patent Office in counterpart European Application No. 10817454.1.
Communication dated Mar. 25, 2013 issued by the European Patent Office in counterpart European Application No. 10817449.1.
Communication dated Apr. 4, 2013 issued by the European Patent Office in counterpart European Application No. 10817447.5.
International Search Report, dated May 13, 2011, issued in International Application No. PCT/KR2010/006422.
International Search Report, dated May 18, 2011, issued in International Application No. PCT/KR2010/006413.
International Search Report, dated May 18, 2011, issued in International Application No. PCT/KR2010/006404.
International Search Report, dated May 20, 2011, issued in International Application No. PCT/KR2010/006428.
International Search Report, dated Jun. 15, 2011, issued in International Application No. PCT/KR2010/006436.
Communication dated Jun. 7, 2013 issued by the European Patent Office in counterpart European Patent Application No. 10817441.8.
Communication from the European Patent Office issued Jan. 2, 2014 in a counterpart European Application No. 10817454.1.
Communication from the European Patent Office issued Feb. 4, 2014 in a counterpart European Application No. 10817441.8.
Communication dated Sep. 19, 2013 issued by the European Patent Office in counterpart European Patent Application No. 10817451.7.
Communication dated Apr. 14, 2014 issued by the State Intellectual Property Office of P.R. China in counterpart Chinese Patent Application No. 201080041699.6.
Communication dated Jun. 27, 2014 issued by the State Intellectual Property Office of P.R. China in counterpart Chinese Patent Application No. 201080041743.3.
Communication dated Apr. 15, 2014 issued by the State Intellectual Property Office of P.R. China in counterpart Chinese Patent Application No. 201080041744.8.
Communication dated Apr. 22, 2014 issued by the State Intellectual Property Office of P.R. China in counterpart Chinese Patent Application No. 201080041745.2.
Communication dated Jun. 3, 2014 issued by the Japanese Patent Office in counterpart Japanese Patent Application No. 2012-529682.
Communication dated Jun. 3, 2014 issued by the Japanese Patent Office in counterpart Japanese Patent Application No. 2012-529684.
Communication dated Jun. 3, 2014 issued by the Japanese Patent Office in counterpart Japanese Patent Application No. 2012-529686.
Communication dated Jun. 3, 2014 issued by the Japanese Patent Office in counterpart Japanese Patent Application No. 2012-529687.
Communication dated Jun. 3, 2014 issued by the Japanese Patent Office in counterpart Japanese Patent Application No. 2012-529688.
Sung-Bum Park, et al; "Novel context modeling scheme for lossless image compression using statistical reference"; Proceedings of the 6th International Symposium on Image and Signal Processing and Analysis; Sep. 16, 2009; pp. 250-253.

* cited by examiner

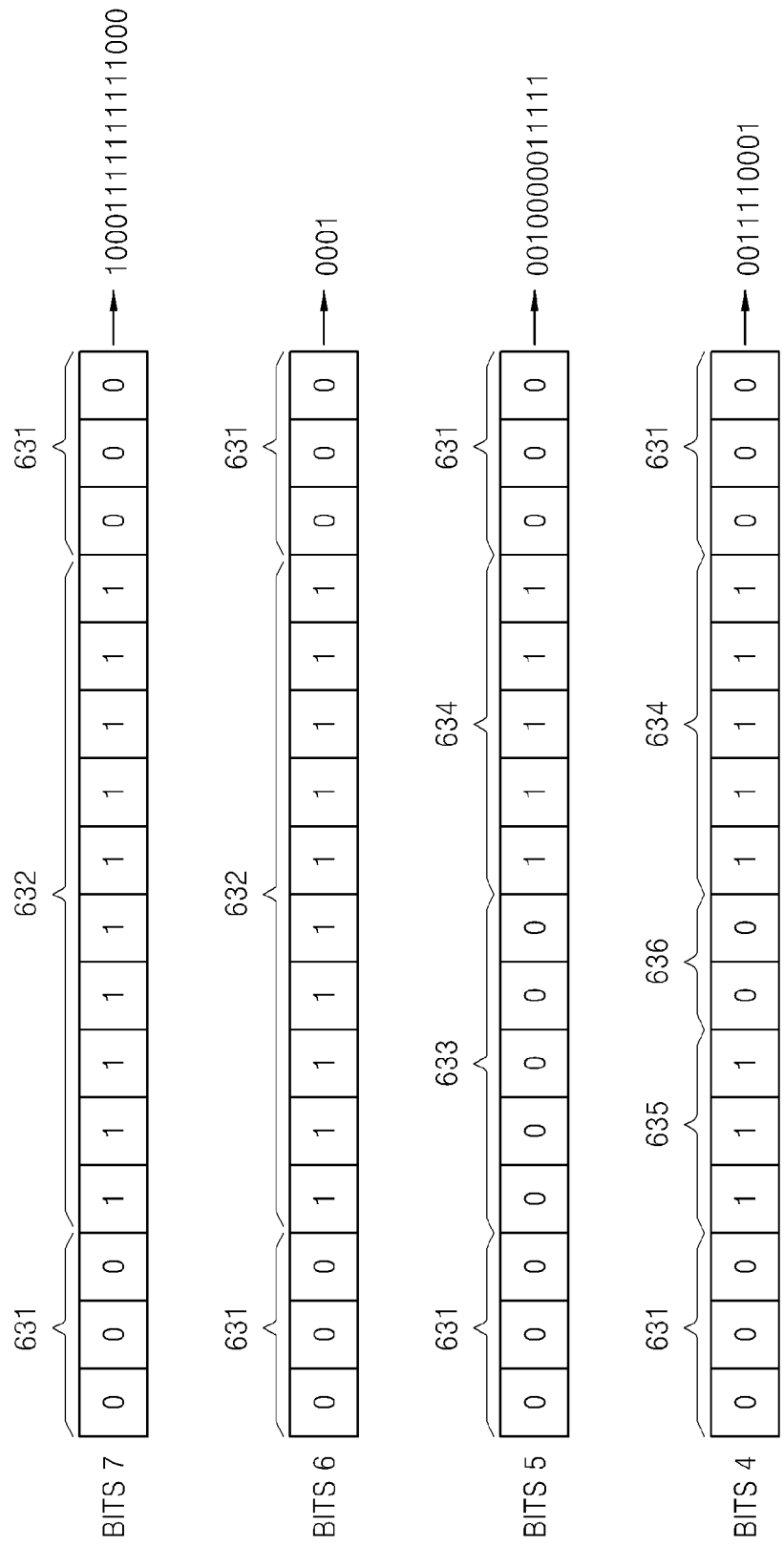

FIG. 14

```
skip_mode_post(){
  if (color_format==1) {
    unit=4
  } else {
    unit=3
  }
  for (i=0; i<nblocks; i++) {
    if (block_mode[i]==2) {
      if (i < unit) {
        for (j=0; j<64; j++) {
          image_data[i*64 + j] = pix_first_blk_skip[i]
        }
      } else {
        for (j=0; j<64; j++) {
          image_data[i*64+j]=image_data[(i-unit)*64+j]
        }
      }
    }
  }
}
```

METHOD AND APPARATUS FOR ENCODING AND DECODING IMAGE BASED ON SKIP MODE

CROSS-REFERENCE TO RELATED PATENT APPLICATIONS

This application claims priority from U.S. Provisional Application No. 61/243,216 filed on Sep. 17, 2009, U.S. Provisional Application No. 61/243,218 filed on Sep. 17, 2009, U.S. Provisional Application No. 61/244,139 filed on Sep. 21, 2009, and U.S. Provisional Application No. 61/257,609 filed on Nov. 3, 2009, the disclosures of which are incorporated herein in their entireties by reference.

BACKGROUND

1. Field

Apparatuses and methods consistent with exemplary embodiments relate to encoding and decoding an image, and more particularly, to encoding and decoding an image in units of blocks.

2. Description of the Related Art

As wireless networks develop, interconnection technologies between devices in a wireless network have become an issue such that many companies have tried to develop such technologies. In particular, a high definition (HD) interconnection technology for replacing a high definition multimedia interface (HDMI) technology is being standardized in a wireless HD (WiHD) specification. According to the WiHD specification, various devices (such as televisions (TVs), home theaters, digital versatile disc (DVD) players, Blu-ray players, and camcorders) may be interconnected in a wireless network.

SUMMARY

Exemplary embodiments provide a method and apparatus for encoding and decoding an image in units of blocks, and a computer-readable record medium having recorded thereon a computer program for executing the method.

According to an aspect of an exemplary embodiment, there is provided an image encoding method including: if a current block of an image is an initial block of a current slice of the image, determining whether a virtual block in which pixel values are equal to a predetermined value is identical to the current block; and encoding the current block in a first mode from among a plurality of modes, based on the determining, wherein the first mode is a mode for encoding information representing that the current block is encoded in the first mode, instead of encoding pixel values of the current block, when the current block is identical to the virtual block.

The predetermined value may be the same value as the pixel values of the current block.

The encoding of the current block may include encoding the current block in any one of a second mode for encoding the current block based on discrete cosine transformation (DCT), and a third mode for encoding the current block based on a plurality of bit planes of pixel values, if the current block is not identical to the virtual block.

The second mode may be a mode for performing the DCT on the pixel values of the current block and encoding the current block in units of bit planes by dividing the current block into a plurality of bit planes from a most significant bit to a least significant bit of coefficients generated as a result of performing the DCT.

The third mode may be a mode for encoding the current block in units of bit planes by dividing the current block into the plurality of bit planes from a most significant bit to a least significant bit of the pixel values of the current block.

The encoding may include encoding information about the predetermined value and inserting the encoded information into a current slice header or a block header of a bitstream.

The encoding may include encoding information about the predetermined value and inserting the encoded information into a part of a bitstream assigned to the pixel values of the current block.

According to an aspect of another exemplary embodiment, there is provided an image decoding method including: decoding information representing an encoding mode of a current block of an image that is an initial block of a current slice of the image; and decoding the current block in a first mode from among a plurality of modes, based on the information representing the encoding mode, wherein the first mode is a mode for decoding the current block based on a virtual block in which pixel values are equal to a predetermined value.

The decoding of the current block in the first mode may include: decoding information about the predetermined value; and decoding the current block by setting pixel values of the current block to be equal to the predetermined value.

According to an aspect of another exemplary embodiment, there is provided an image encoding apparatus including: a mode determination unit which, if a current block of an image is an initial block of a current slice of the image, determines whether a virtual block in which pixel values are equal to a predetermined value is identical to the current block; and an encoder which encodes the current block in a first mode from among a plurality of modes, based on the determining, wherein the first mode is a mode for encoding information representing that the current block is encoded in the first mode, instead of encoding pixel values of the current block, when the current block is identical to the virtual block.

According to an aspect of another exemplary embodiment, there is provided an image decoding apparatus including: a mode information decoder which decodes information representing an encoding mode of a current block of an image that is an initial block of a current slice of the image; and a decoder which decodes the current block in a first mode from among a plurality of modes, based on the information representing the encoding mode, wherein the first mode is a mode for decoding the current block based on a virtual block in which pixel values are equal to a predetermined value.

According to an aspect of another exemplary embodiment, there is provided a computer-readable record medium having recorded thereon a computer program for executing the above methods.

According to an aspect of another exemplary embodiment, there is provided an image encoding method including: encoding an initial block of a current slice of an image in a first mode from among a plurality of modes, wherein the initial block is identical to a virtual block in which pixel values are equal to a predetermined value, and wherein the first mode is a mode for encoding information representing that the initial block is encoded in the first mode, instead of encoding pixel values of the initial block.

BRIEF DESCRIPTION OF THE DRAWINGS

The above and other aspects will become more apparent by describing in detail exemplary embodiments thereof with reference to the attached drawings in which:

FIG. 6B is a diagram for describing a bit plane-based encoding method according to an exemplary embodiment;

FIG. 14 illustrates a syntax of a method of restoring a current block in a skip mode, according to an exemplary embodiment.

DETAILED DESCRIPTION OF EXEMPLARY EMBODIMENTS

Hereinafter, exemplary embodiments will be described in detail with reference to the attached drawings. Expressions such as "at least one of," when preceding a list of elements, modify the entire list of elements and do not modify the individual elements of the list.

Figure 1:
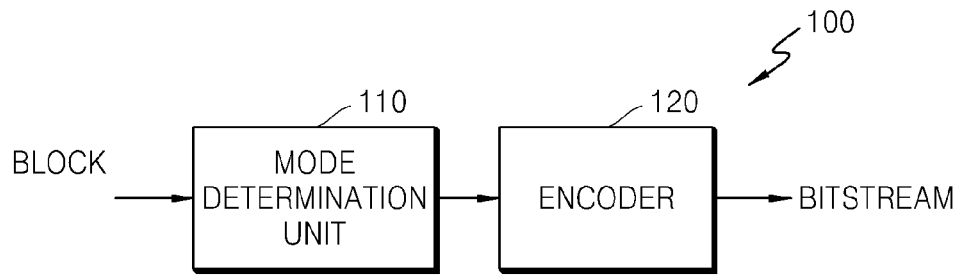
FIG. 1 is a block diagram of an image encoding apparatus according to an exemplary embodiment.

FIG. 1 is a block diagram of an image encoding apparatus 100 according to an exemplary embodiment. Referring to FIG. 1, the image encoding apparatus 100 includes a mode determination unit 110 and an encoder 120.

The mode determination unit 110 determines an encoding mode of a current block. Devices, such as TVs, home theaters, DVD players, Blu-ray players, mobile devices, personal and laptop computers, camcorders, etc., are interconnected in a wireless network to transmit and receive high quality contents equal to or above, for example, a high definition (HD) level. A standard for allowing interconnection between various devices is being established and characterized by a small memory and low complexity. Accordingly, complex image encoding methods (such as MPEG-1, MPEG-2, and MPEG-4H.264/MPEG-4 advanced video coding (AVC) methods) for increasing a compression ratio may not be used.

However, if an image is transmitted without compressing pixel values of the image, a wireless network having a high transmission rate is used such that interconnection between various devices may be interrupted. Accordingly, if an image is encoded and decoded as according to a skip mode, a natural mode, or a graphic mode to be described below, low complexity and an appropriate level of compression ratio may be ensured.

The skip mode is a mode for encoding a current block based on whether the current block is identical or similar to a neighboring block of the current block. The natural mode is a mode for encoding a current block by performing discrete cosine transformation (DCT) and bit plane splitting if the current block is a block of a natural image. The graphic mode is a mode for encoding a current block by performing bit plane splitting if the current block is a block of an artificial image such as a text image. The skip mode, the natural mode, and the graphic mode will be described in detail below with reference to FIGS. 3 through 5.

The mode determination unit 110 determines one of the above-mentioned modes to be used to encode the current block. For example, the mode determination unit 110 decides whether the current block is identical or similar to a neighboring block that is encoded prior to the current block in a current slice by comparing pixel values of the current block to pixel values of the neighboring block. Operations of the mode determination unit 110 according to one or more exemplary embodiments will be described in detail with reference to FIGS. 2 and 3.

Figure 2:
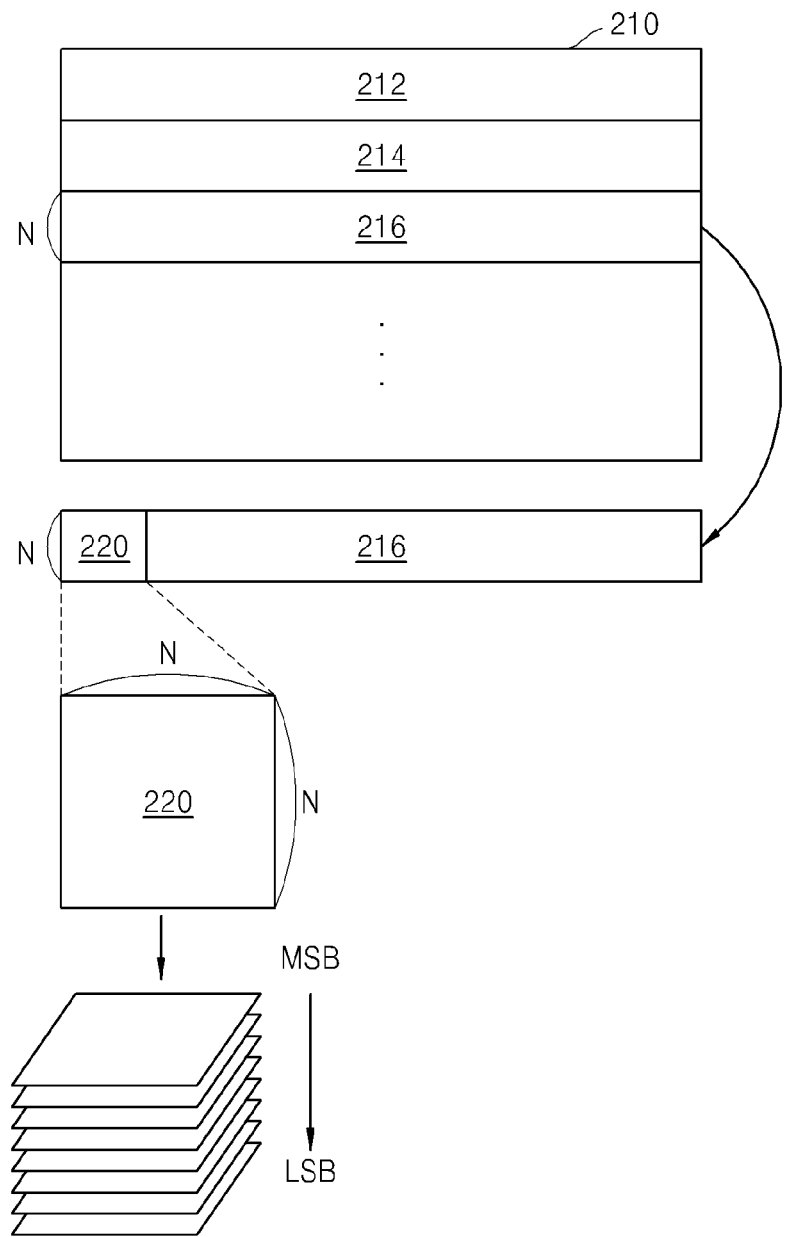
FIG. 2 is a diagram illustrating an operation of an image encoding apparatus according to an exemplary embodiment.

FIG. 2 is a diagram illustrating an operation of an image encoding apparatus 100 according to an exemplary embodiment. Referring to FIG. 2, the image encoding apparatus 100 encodes an image by splitting the image in units of slices, blocks, and bit planes. The image encoding apparatus 100 splits a current picture 210 into a plurality of slices 212 through 216 each having N rows of pixels, splits each of the slices 212 through 216 into N×N blocks 220, and splits each of the blocks 220 into a plurality of bit planes from a bit plane of most significant bits (MSBs) to a bit plane of least significant bits (LSBs). For example, if pixel values or DCT coefficients of a block 220 are represented by M bits, the block 220 may be split into M bit planes.

Figure 3A:
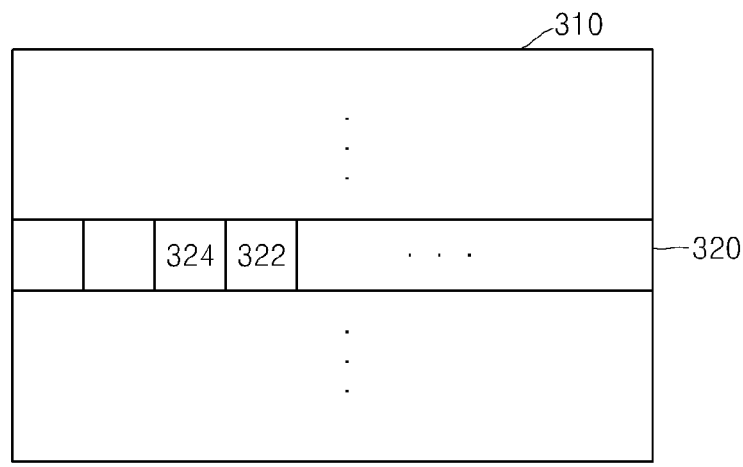
FIGS. 3A through 3C are diagrams for describing a method of determining a skip mode, according to an exemplary embodiment.
Figure 3B:
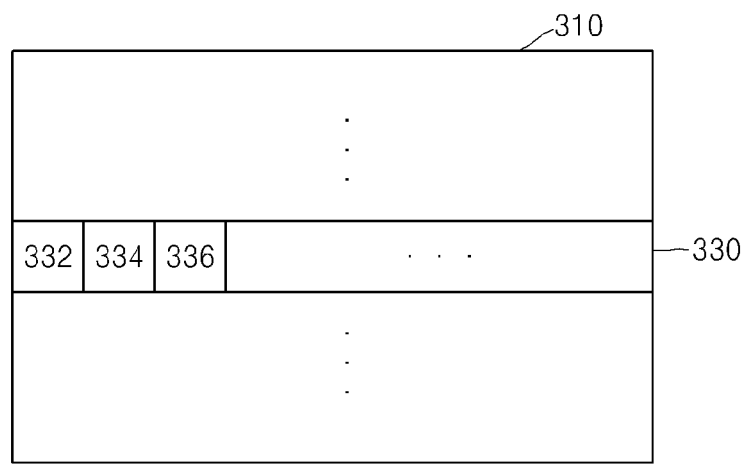
Figure 3C:
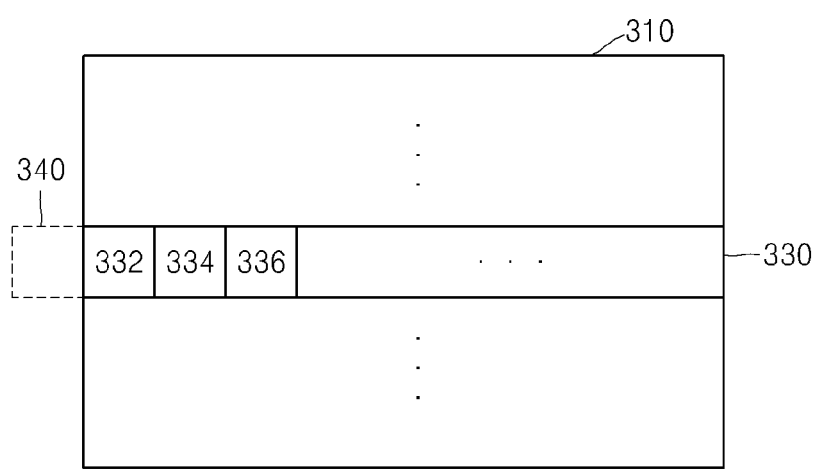

FIGS. 3A through 3C are diagrams for describing a method of determining a skip mode, according to an exemplary embodiment. Referring to FIG. 3A, as described above with reference to FIG. 2, a current picture 310 may be split into a plurality of slices. A case when the image encoding apparatus 100 encodes a current slice 320 will be exemplarily described.

In order to encode a current block 322 of the current slice 320, the mode determination unit 110 of the image encoding apparatus 100 decides whether the current block 322 is identical or similar to a neighboring block 324 that is encoded prior to the current block 322. For example, the current block 322 may be identical or similar to the neighboring block 324 that is spatially adjacent to the current block 322. Accordingly, the mode determination unit 110 may determine an encoding mode of the current block 322 as the skip mode if the current block 322 is identical or similar to the neighboring block 324 that is to the left of the current block 322. The neighboring block 324 may be a block that is encoded immediately prior to the current block 322, though it is understood that another exemplary embodiment is not limited thereto.

Whether the current block 322 is identical or similar to the neighboring block 324 may be decided by using any of various methods. For example, a cost may be calculated based on at least one of a sum of absolute differences (SAD), a mean square error (MSE), a signal to noise ratio (SNR), a maximum difference between the current block 322 and the neighboring block 324, etc., and whether the current block 322 is identical or similar to the neighboring block 324 may be decided according to the calculated cost. If the SAD, the MSE, the SNR, or the maximum difference has or is close to a value of 0 or is less than or equal to a predetermined number, it may be decided that the current block 322 is identical or similar to the neighboring block 324.

However, as shown in FIG. 3B, if a current block 332 is an initial block of a current slice 330, it may be difficult to encode the current block 332 since a neighboring block that is encoded prior to the current block 332 may not exist to compare with. Accordingly, an encoding mode of the current block 332 is not determined as the skip mode but as the natural mode or the graphic mode to be described below.

If the current slice 330 is a slice including a region filled with the same pixel values, other blocks 334 and 336 of the current slice 330 may be encoded in a skip mode. However, since the current block 332 cannot be encoded in a skip mode despite the current block 332 being a block of the same region as the other blocks 334 and 336, the current block 332 is encoded in a natural mode or a graphic mode.

According to an exemplary embodiment, as shown in FIG. 3C, the mode determination unit 110 may set a virtual block 340 and determine an encoding mode of the current block 332 as the skip mode based on the virtual block 340. If the virtual block 340 is identical or similar to the current block 332, the encoding mode of the current block 332 is determined as the skip mode, and if the virtual block 340 is not identical or similar to the current block 332, the encoding mode of the current block 332 is determined as the natural mode or the graphic mode. The virtual block 340 is not an actual block of the current picture 310, but is a virtually added block to determine the encoding mode of the current block 332 that is an initial block.

A method of setting the virtual block 340 is not limited. For example, if pixel values of the virtual block 340 are variously set, a number of additional bits are used to transmit information about the virtual block 340 to a decoder. Accordingly, the pixel values of the virtual block 340 may be set to all have the same value.

According to an exemplary embodiment, the same pixel values of the virtual block 340 may be set to have the same value as pixel values of the current block 332. If the current block 332 is a block of the region having the same pixel values, the pixel values of the current block 332 may have the same value, and thus when the pixel values of the virtual block 340 are set identically to the pixel values of the current block 332, the encoding mode of the current block 332 may be determined as the skip mode. When the virtual block 340 is set in order to determine an encoding mode of an initial block as a skip mode, information about the pixel values of the virtual block 340 is to be separately encoded and transmitted to the decoder. This will be described in detail below with reference to the encoder 120 of FIG. 1.

The encoding mode of the current block 322 may be determined as the skip mode only when the mode determination unit 110 determines that the current block 322 is completely identical to the neighboring block 324, or when the mode determination unit 110 determines that the current block 322 is similar to the neighboring block 324. That is, the encoding mode of the current block 322 may be determined as the skip mode only when the SAD, the MSE, or the maximum difference has a value of 0, or when the SAD, the MSE, or the maximum difference is equal to or less than a predetermined threshold value such that it is determined that the current block 322 is similar to the neighboring block 324.

Similarly, when the current block 332 is the initial block of the current slice 330, the encoding mode of the current block 332 may be determined as the skip mode only when the current block 332 is completely identical to the virtual block 340, or when the current block 332 is similar to the virtual block 340.

If the mode determination unit 110 determines that the encoding mode of the current block 322 is not the skip mode, the mode determination unit 110 determines a natural mode or a graphic mode as the encoding mode of the current block 322. If the current block 322 is a block of a natural image, i.e., a non-artificial image, the mode determination unit 110 determines the encoding mode of the current block 322 as the natural mode. Furthermore, if the current block 322 is a block of an artificial image, such as a text image or a computer graphic image, the mode determination unit 110 determines the encoding mode of the current block 322 as the graphic mode.

The method of deciding whether the current block 322 is a block of a natural image or a block of an artificial image is not restricted to that described above and any of various algorithms may be used. For example, since identical pixel values may be distributed in a certain region of an artificial image, pixel values of the current block 322 may be compared and, if the number of identical pixel values is equal to or greater than a predetermined number, it may be decided that the current block 322 is a block of an artificial image.

Furthermore, according to another exemplary embodiment, the current block 322 may be encoded individually in the natural mode and the graphic mode, and the encoding mode of the current block 322 may be determined as the natural mode or the graphic mode based on rate distortion (RD) costs of the encoded blocks. The method using the RD costs will be described below with reference to FIG. 7.

Referring back to FIG. 1, when the mode determination unit 110 determines the encoding mode of the current block, the encoding unit 120 encodes the current block in the encoding mode determined by the mode determination unit 110.

If the current block is identical or similar to the neighboring block or the virtual block such that the encoding mode of the current block is determined as the skip mode, the encoding unit 120 encodes information, e.g., flag information, representing that the current block is encoded in the skip mode, instead of encoding the pixel values of the current block.

Since flag information of one bit may be encoded instead of encoding all of the pixel values of the current block, an image compression ratio is improved. Also, since only the neighboring block or the virtual block that is encoded prior to the current block is referred to in order to encode the current block in the skip mode, the skip mode requires low complexity.

If the current block is an initial block of a current slice such that the encoding mode of the current block is determined as the skip mode by referring to the virtual block, information about pixel values of the virtual block is encoded and inserted into a bitstream. When the pixel values of the virtual block are set to have the same value as described above, the information about the pixel values of the virtual block may be encoded by encoding one pixel value. The information about the pixel values of the virtual block may be inserted into a slice header or a block header of the bitstream, or into a part of the bitstream assigned to the pixel values of the current block instead of the pixel values of the current block.

If the encoding mode of the current block is not determined as the skip mode, the encoding unit 120 encodes the current block in the natural mode or the graphic mode. If the mode determination unit 110 determines the encoding mode of the current block as the natural mode, the encoding unit 120 encodes the current block in the natural mode. Otherwise, if the mode determination unit 110 determines the encoding mode of the current block as the graphic mode, the encoding unit 120 encodes the current block in the graphic mode. Encoding methods in the natural mode and the graphic mode according to one or more exemplary embodiments will be described in detail with reference to FIGS. 4, 5, 6A, and 6B.

Figure 4:
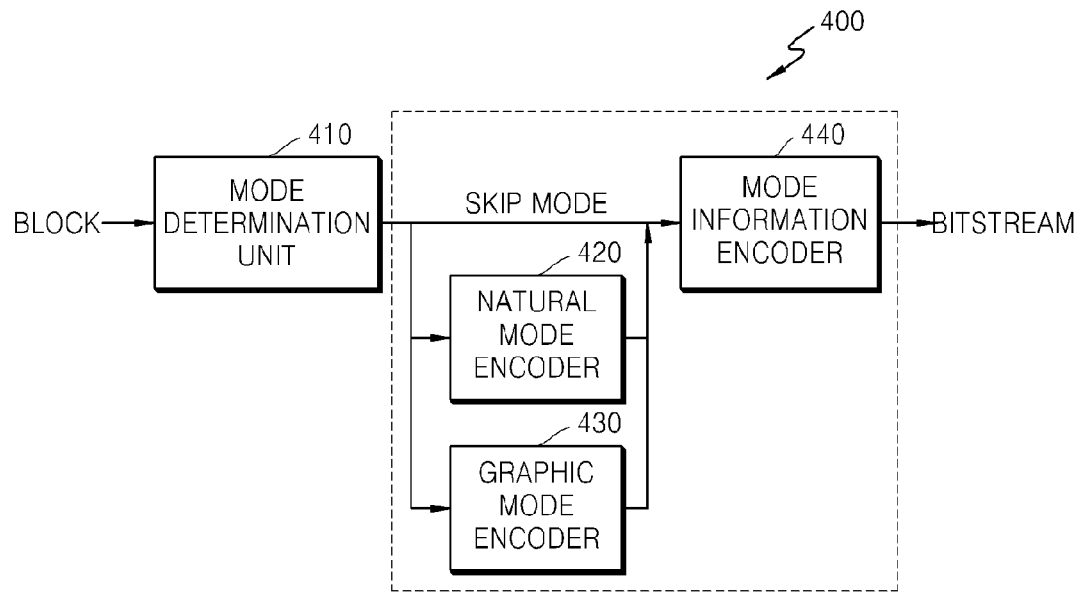
FIG. 4 is a block diagram of an image encoding apparatus according to another exemplary embodiment.

FIG. 4 is a block diagram of an image encoding apparatus 400 according to another exemplary embodiment. Referring to FIG. 4, the image encoding apparatus 400 includes a mode determination unit 410, a natural mode encoder 420, a graphic mode encoder 430, and a mode information encoder 440. The mode determination unit 410 may correspond to the mode determination unit 110 illustrated in FIG. 1, and the natural mode encoder 420, the graphic mode encoder 430, and the mode information encoder 440 may correspond to the encoding unit 120 illustrated in FIG. 1.

The mode determination unit 410 determines an encoding mode of a current block from among a skip mode, a natural mode, and a graphic mode.

If the mode determination unit 410 determines the encoding mode of the current block as the skip mode, the mode information encoder 440 encodes information, e.g., flag information, representing that the current block is encoded in the skip mode instead of encoding pixel values of the current block.

If the mode determination unit 410 determines the encoding mode of the current block as the natural mode, the natural mode encoder 420 encodes the current block in the natural mode by performing DCT on the current block to generate DCT coefficients, separating the generated DCT coefficients into a plurality of bit planes, and encoding each of the bit planes by using a bit plane-based encoding method. An encoding method in a natural mode according to an exemplary embodiment will now be described in detail with reference to FIG. 5.

Figure 5:
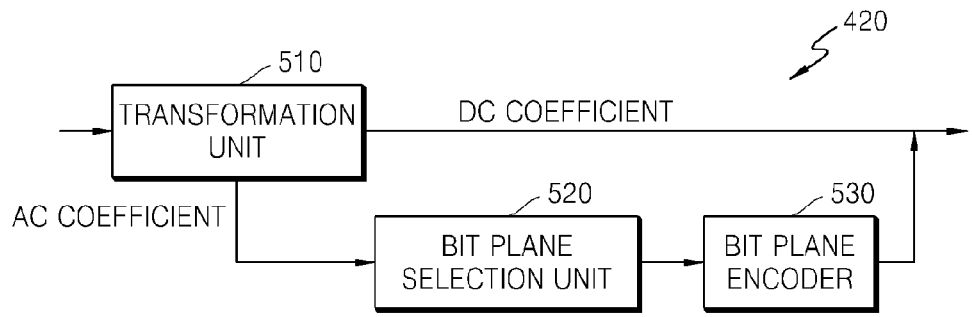
FIG. 5 is a block diagram of a natural mode encoder of an image encoding apparatus according to an exemplary embodiment.

FIG. 5 is a block diagram of a natural mode encoder 420 of an image encoding apparatus 100 according to an exemplary embodiment. Referring to FIG. 5, the natural mode encoder 420 includes a transformation unit 510, a bit plane selection unit 520, and a bit plane encoder 530.

The transformation unit 510 performs DCT on a current block to generate DCT coefficients. DCT is only an exemplary method of transforming pixel values of the pixel domain to the frequency domain and generating frequency domain coefficients, and one of ordinary skill in the art will easily understand that any other method may be used to transform the current block in another exemplary embodiment.

From among the DCT coefficients generated when the transformation unit 510 performs DCT on the current block, bit strings of direct current (DC) coefficients are inserted into a bitstream as they are. However, alternating current (AC) coefficients are encoded by using a bit plane-based encoding method.

The bit plane selection unit 520 separates the AC coefficients into a plurality of bit planes from a bit plane of MSBs to a bit plane of LSBs. M-bit AC coefficients are separated in units of bits to generate M bit planes. A first bit plane of the MSBs of bitstreams of the AC coefficients is generated, and a second bit plane of second MSBs of the bitstreams is generated. This operation is repeated to the LSBs to generate the M bit planes.

When the bit plane selection unit 520 generates the bit planes, the bit plane encoder 530 encodes each of the generated bit planes by using a bit plane-based encoding method. A method of encoding the bit planes is not restrictive and any bit plane-based encoding method may be used. Also, according to an exemplary embodiment, each of the bit planes may be encoded by using a bit mask. A region having significant bits may be set in each of the bit planes by using a bit mask, and bit plane-based encoding may be performed on only the set region.

It is understood that the method of separately encoding the DC coefficients and the AC coefficients described above is exemplarily described, and the natural mode encoder 420 may use any method of encoding the current block by performing DCT and by using a bit plane-based encoding method.

Referring back to FIG. 4, if the mode determination unit 410 determines the encoding mode of the current block as the graphic mode, the graphic mode encoder 430 encodes the current block in the graphic mode by separating the pixel values of the current block into a plurality of bit planes and encoding each of the bit planes by using a bit plane-based encoding method. An encoding method in a graphic mode according to one or more exemplary embodiments will now be described in detail with reference to FIGS. 6A and 6B.

Figure 6A:
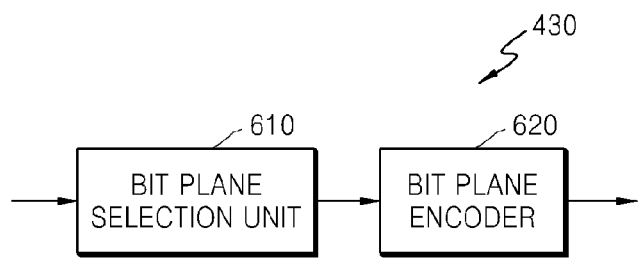
FIG. 6A is a block diagram of a graphic mode encoder of the image encoding apparatus illustrated in FIG. 4, according to an exemplary embodiment.

FIG. 6A is a block diagram of a graphic mode encoder 430 of an image encoding apparatus 400 according to an exemplary embodiment. Referring to FIG. 6A, the graphic mode encoder 430 includes a bit plane selection unit 610 and a bit plane encoder 620.

The bit plane selection unit 610 separates pixel values of a current block into a plurality of bit planes. For example, P-bit pixel values are separated in units of bits to generate P bit planes from a bit plane of MSBs to a bit plane of LSBs.

When the bit plane selection unit 610 generates the bit planes, the bit plane encoder 620 encodes each of the generated bit planes by using a bit plane-based encoding method.

FIG. 6B is a diagram for describing a bit plane-based encoding method according to an exemplary embodiment. Referring to FIG. 6B, the bit plane encoder 620 encodes a bit plane by grouping identical bit values. A case when a current block has a size of 4×4 and 8-bit pixel values will be exemplarily described. The bit plane encoder 620 encodes a bit plane of bits 7 that are MSBs as illustrated in FIG. 6B. The bit plane of bits 7 is encoded by separating a group 631 having a value of 0 from a group 632 having a value of 1. Since the bit plane of bits 7 is divided into the groups 631 and 632 according to a bit value, a value of 1 is encoded and a value of 0001111111111000 representing individual bits of the groups 631 and 632 is encoded.

A bit plane of bits 6 is encoded based on whether each of the groups 631 and 632 in the bit plane of bits 7 is split into groups having different bit values. In FIG. 6B, since both of the group 631 having a value of 0 and the group 632 having a value of 1 are not split, a value of 00 representing that the group 631 having a value of 0 is not split and a value of 01 representing the group 632 having a value of 1 is not split are encoded.

In a bit plane of bits 5, the group 632 having a value of 1 in the bit plane of bits 6 is split into two groups 633 and 634. Accordingly, a value of 00 representing that the group 631 having a value of 0 is not split is encoded, and a value of 1 representing that the group 632 having a value of 1 is split is encoded. Moreover, a value of 0000011111 representing individual bits of the groups 634 and 644-633 split from the group 632 having a value of 1 is encoded.

In a bit plane of bits 4, the group 633 having a value of 0, which is split from the group 632 having a value of 1, is split into two groups 635 and 636. Accordingly, a value of 00 representing that the group 631 having a value of 0 is not split is encoded. Also, a value of 1 representing that the group 633 having a value of 0, which is split from the group 632 having a value of 1, is split is encoded, and a value of 11100 representing individual bits of the groups 635 and 636 split from the group 633 is encoded. Furthermore, a value of 01 representing that the group 634 having a value of 1 is not split is encoded.

The bit plane encoder 620 encodes every bit plane to a bit plane of LSBs by repeatedly performing a bit plane-based encoding method based on bit groups generated by grouping identical bit values as described above.

Referring back to FIG. 4, the mode information encoder 440 encodes information representing the encoding mode of the current block. If the mode determination unit 410 determines the encoding mode of the current block as the skip mode, the mode information encoder 440 encodes information, e.g., flag information, representing that the current block is encoded in the skip mode. Furthermore, if the current block is an initial block of a current slice and is encoded in the skip mode since the current block is identical or similar to the virtual block, the information about the pixel values of the virtual block is also encoded and inserted into the bitstream. If the pixel values of the virtual block are set to have the same value as described above, only one pixel value may be encoded and inserted into the slice header or the block header.

If the mode determination unit 410 determines the encoding mode of the current block as the natural mode or the graphic mode, as in the skip mode, the mode information encoder 440 encodes information, e.g., flag information, representing that the current block is encoded in the natural mode or the graphic mode.

Also, the mode information encoder 440 may encode information, e.g., flag information, representing whether a current slice including the current block includes blocks encoded in the skip mode, the natural mode, or the graphic mode. The flag information representing the current slice may be a syntax element of the current slice.

Figure 7:
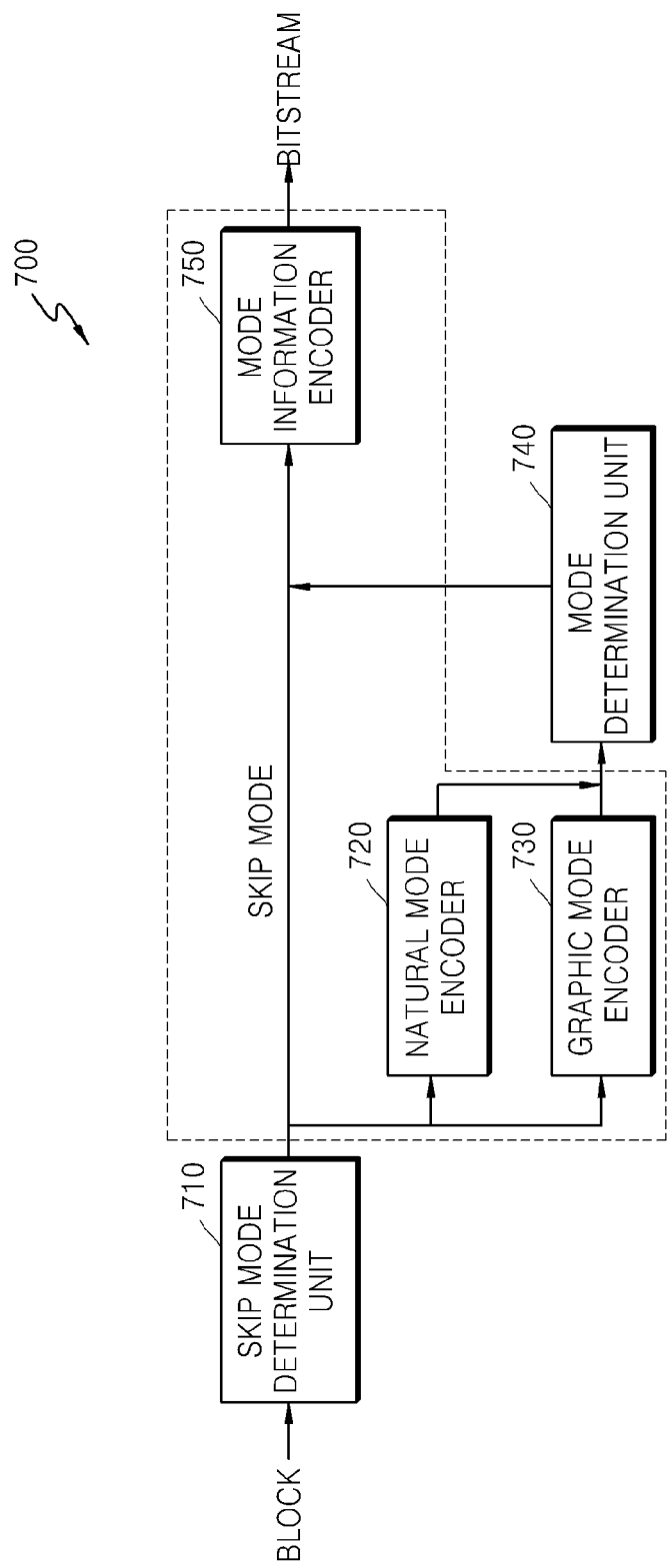
FIG. 7 is a block diagram of an image encoding apparatus according to another exemplary embodiment.

FIG. 7 is a block diagram of an image encoding apparatus 700 according to another exemplary embodiment. Referring to FIG. 7, the image encoding apparatus 700 includes a skip mode determination unit 710, a natural mode encoder 720, a graphic mode encoder 730, a mode determination unit 740, and a mode information encoder 750.

The skip mode determination unit 710 and the mode determination unit 740 may correspond to the mode determination unit 110 illustrated in FIG. 1, and the natural mode encoder 720, the graphic mode encoder 730, and the mode information encoder 750 may correspond to the encoding unit 120 illustrated in FIG. 1.

The skip mode determination unit 710 determines whether to encode a current block in a skip mode. For example, the skip mode determination unit 710 compares pixel values of the current block to pixel values of a neighboring block that is encoded prior to the current block, or to pixel values of a virtual block, and determines the encoding mode of the current block as the skip mode if the current block is identical or similar to the neighboring block or the virtual block.

If the skip mode determination unit 710 determines the encoding mode of the current block as the skip mode, the mode information encoder 750 encodes information, e.g., flag information, representing that the current block is encoded in the skip mode. If the current block is an initial block of a current slice, information about the pixel values of the virtual block may also be encoded and inserted into a bitstream.

If the skip mode determination unit 710 does not determine the encoding mode of the current block as the skip mode, the natural mode encoder 720 and the graphic mode encoder 730 respectively encode the current block in a natural mode and a graphic mode.

The mode determination unit 740 compares the blocks encoded by the natural mode encoder 720 and the graphic mode encoder 730, and determines whether to encode the current block in the natural mode or the graphic mode.

For example, the mode determination unit 740 calculates RD costs based on a result of encoding the current block in the natural mode and a result of encoding the current block in the graphic mode, according to the equation: cost=(rate)+(lambda)×(distortion). Accordingly, the mode determination unit 740 determines one of the natural mode and the graphic mode that has a lower cost as the encoding mode of the current block. A value of lambda may be variably set according to an exemplary embodiment, and a reference value for selecting the natural mode or the graphic mode may be changed by adjusting the value of lambda.

If the mode determination unit 740 determines the encoding mode of the current block as the natural mode or the graphic mode, the mode information encoder 750 encodes information, e.g., flag information, representing that the current block is encoded in the natural mode or the graphic mode.

Also, as described above with reference to FIG. 6, instead of encoding the information representing the encoding mode of each block, the mode information encoder 750 may encode information representing whether a current slice includes blocks encoded in the skip mode, the natural mode, or the graphic mode.

Figure 8:
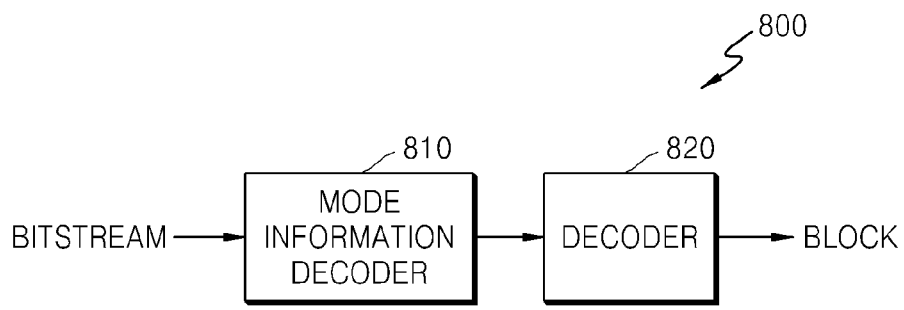
FIG. 8 is a block diagram of an image decoding apparatus according to an exemplary embodiment.

FIG. 8 is a block diagram of an image decoding apparatus 800 according to an exemplary embodiment. Referring to FIG. 8, the image decoding apparatus 800 includes a mode information decoder 810 and a decoder 820.

The mode information decoder 810 decodes information representing an encoding mode of a current block, which is included in a bitstream. For example, the mode information decoder 810 decodes information representing whether the current block is encoded in a skip mode, a natural mode, or a graphic mode, by parsing the bitstream.

The decoder 820 decodes the current block based on the information decoded by the mode information decoder 810. If the decoded information represents that the current block is encoded in the skip mode, the decoder 820 restores the current block based on a block that is identical or similar to the current block, i.e., a neighboring block decoded prior to the current block. The neighboring block may be a block that is decoded immediately prior to the current block, though it is understood that another exemplary embodiment is not limited thereto.

If the current block is an initial block of a current slice and is encoded in the skip mode, information about pixel values of a virtual block is decoded, and the current block is restored based on the decoded information about the pixel values of the virtual block. The current block that is the initial block may be decoded in the skip mode by setting the pixel values of the current block to be identical to the pixel values of the virtual block. If the information about the pixel values of the virtual block is inserted into a slice header or a block header, the information about the pixel values of the virtual block may be decoded before decoding the pixel values of the current block so as to use the pixel values of the virtual block to decode the pixel values of the current block. Alternatively, when the information about the pixel values of the virtual block is inserted into the bitstream instead of the pixel values of the current block, the information about the pixel values of the virtual block may be decoded while the pixel values of the current block are restored, so as to use the pixel values of the virtual block to restore the pixel values of the current block.

If the decoded information represents that the current block is encoded in the natural mode or the graphic mode, the decoder 820 restores the current block by inversely performing the encoding operations as, for example, described above with reference to FIGS. 5 and 6A. A decoding method of the current block according to an exemplary embodiment will be described in detail with reference to FIG. 9.

Figure 9:
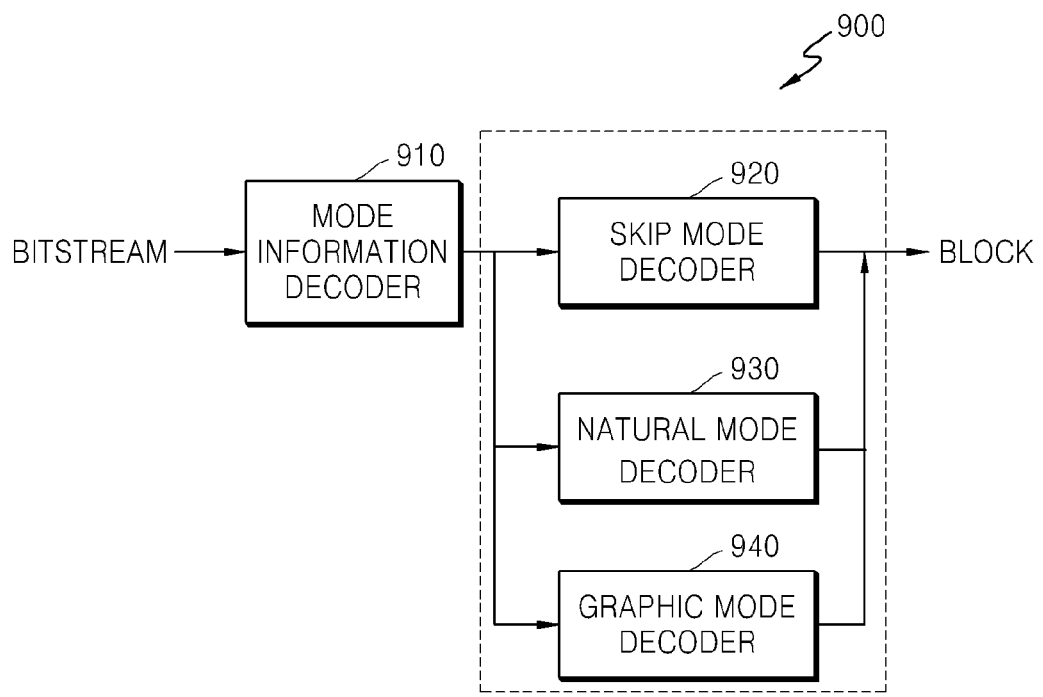
FIG. 9 is a block diagram of an image decoding apparatus according to another exemplary embodiment.

FIG. 9 is a block diagram of an image decoding apparatus 900 according to another exemplary embodiment. Referring to FIG. 9, the image decoding apparatus 900 includes a mode information decoder 910, a skip mode decoder 920, a natural mode decoder 930, and a graphic mode decoder 940. The mode information decoder 910 may correspond to the mode information decoder 810 illustrated in FIG. 8, and the skip mode decoder 920, the natural mode decoder 930, and the graphic mode decoder 940 may correspond to the decoder 820 illustrated in FIG. 8.

The mode information decoder 910 decodes information representing an encoding mode of a current block, which is included in a bitstream.

The skip mode decoder 920 decodes the current block in a skip mode if the decoded information represents that the current block is encoded in the skip mode. The skip mode decoder 920 restores the current block based on a neighboring block decoded prior to the current block. In this case, the current block may be restored by copying the neighboring block. If the current block is an initial block of a current slice, the skip mode decoder 920 restores the current block based on pixel values of a virtual block. When the pixel values of the virtual block are set to have the same value, the skip mode decoder 920 restores the current block by setting pixel values of the current block to the same pixel value of the virtual block.

The natural mode decoder 930 decodes the current block in a natural mode if the decoded information represents that the current block is encoded in the natural mode. The natural mode decoder 930 parses DC coefficients from among DCT coefficients included in the bitstream, and restores a plurality of bit planes of AC coefficients from among the DCT coefficients, by using a bit plane-based decoding method. If the AC coefficients are restored by combining the restored bit planes, inverse DCT (IDCT) is performed based on the restored AC coefficients and the parsed DC coefficients. As such, the current block is restored.

The graphic mode decoder 940 decodes the current block in a graphic mode if the decoded information represents that the current block is encoded in the graphic mode. The graphic mode decoder 940 restores a plurality of bit planes of pixel values of the current block by using a bit plane-based decoding method, and restores the pixel values of the current block by combining the restored bit planes.

Figure 10:
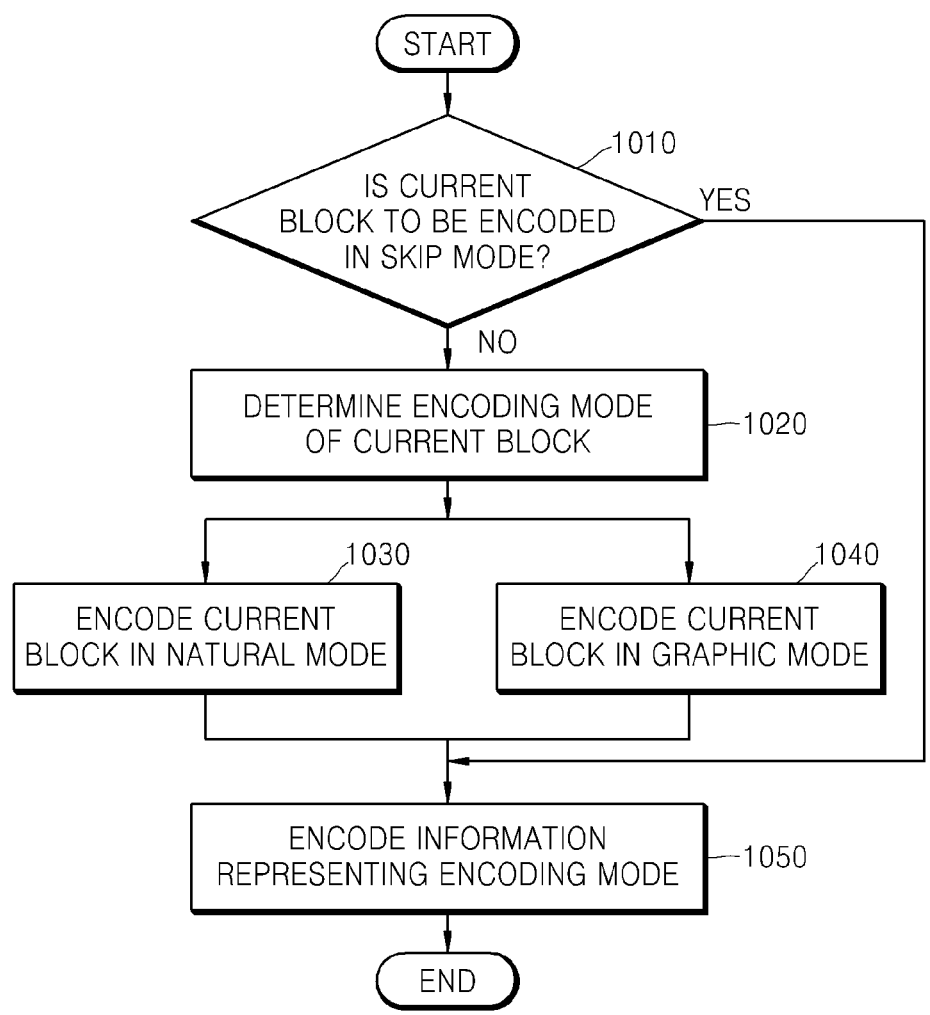
FIG. 10 is a flowchart of an image encoding method according to an exemplary embodiment.

FIG. 10 is a flowchart of an image encoding method according to an exemplary embodiment. Referring to FIG. 10, in operation 1010, the image encoding apparatus 100 or 400 illustrated in FIG. 1 or 4 determines whether to encode a current block in a skip mode. The skip mode is a mode for encoding information representing that the current block is encoded in the skip mode, instead of encoding pixel values of the current block, when the current block is identical or similar to a neighboring block of the current block. If the current block is an initial block of a current slice, it is determined whether the current block is identical or similar to a virtual block. Pixel values of the virtual block may be set to have the same value, which is identical to the pixel values of the current block.

If it is determined in operation 1010 that the encoding mode of the current block is not the skip mode, in operation 1020, the image encoding apparatus 100 or 400 determines whether to encode the current block in a natural mode or a graphic mode. As described above with reference to the mode determination unit 110 illustrated in FIG. 1, the encoding mode of the current block may be determined as the natural mode or the graphic mode based on whether the current block is a block of a natural image or a block of an artificial image.

In operation 1030, the image encoding apparatus 100 or 400 encodes the current block in the natural mode if it is determined that the current block is a block of a natural image in operation 1020. An encoding method in a natural mode according to an exemplary embodiment is described above with reference to FIG. 5.

In operation 1040, the image encoding apparatus 100 or 400 encodes the current block in the graphic mode if it is determined that the current block is a block of an artificial image in operation 1020. An encoding method in a graphic mode according to an exemplary embodiment is described above with reference to FIG. 6A.

In operation 1050, the image encoding apparatus 100 or 400 encodes information, e.g., flag information, representing the encoding mode of the current block. If the encoding mode of the current block is determined as the skip mode in operation 1010, the image encoding apparatus 100 or 400 encodes information representing that the current block is encoded in the skip mode, instead of encoding the pixel values of the current block. If the current block is an initial block of a current slice, information about pixel values of a virtual block, which has been referred to while determining the encoding mode of the current block as the skip mode in operation 1010, is also encoded with the current block. When the pixel values of the virtual block are set to have the same value, one pixel value may be encoded. The information about the pixel value of the virtual block may be encoded and inserted into a slice header or a block header, or may be inserted into a part of a bitstream assigned to the pixel values of the current block, instead of the pixel values of the current block.

Also, if the encoding mode of the current block is not determined as the skip mode in operation 1010 and the current block is encoded in the natural mode or the graphic mode in operation 1030 or 1040, the image encoding apparatus 100 or 400 encodes information, e.g., flag information, representing that the current block is encoded in the natural mode or the graphic mode.

Figure 11:
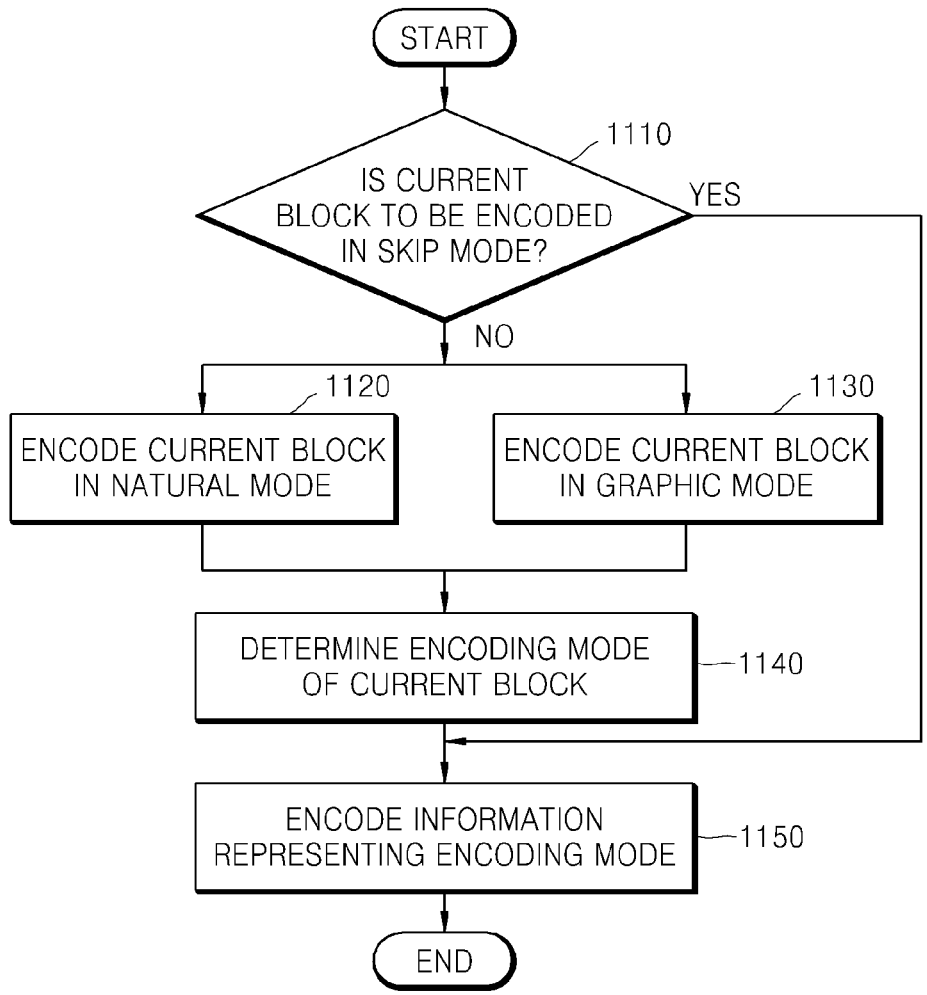
FIG. 11 is a flowchart of an image encoding method according to another exemplary embodiment.

FIG. 11 is a flowchart of an image encoding method according to another exemplary embodiment. Referring to FIG. 11, in operation 1110, the image encoding apparatus 100 or 700 illustrated in FIG. 1 or 7 determines whether to encode a current block in a skip mode. Operation 1110 may correspond to operation 1010 illustrated in FIG. 10.

If the encoding mode of the current block is not determined as the skip mode in operation 1110, in operations 1120 and 1130, the image encoding apparatus 100 or 700 separately encodes the current block in a natural mode and a graphic mode.

In operation 1140, the image encoding apparatus 100 or 700 compares a result of the natural mode encoding to a result of the graphic mode encoding, and determines the encoding mode of the current block based on the comparison. For example, the image encoding apparatus 100 or 700 calculates RD costs based on the results of the natural mode encoding and the graphic mode encoding, and determines one of the natural mode and the graphic mode, which has a lower cost, as the encoding mode of the current block.

In operation 1150, the image encoding apparatus 100 or 700 encodes information representing the encoding mode of the current block. If the encoding mode of the current block is determined as the skip mode in operation 1110, the image encoding apparatus 100 or 700 encodes information, e.g., flag information, representing that the current block is encoded in the skip mode, instead of encoding pixel values of the current block. Also, if the encoding mode of the current block is not determined as the skip mode in operation 1110 and is determined as the natural mode or the graphic mode in operation 1140, the image encoding apparatus 100 or 700 encodes information, e.g., flag information, representing that the current block is encoded in the natural mode or the graphic mode.

Figure 12:
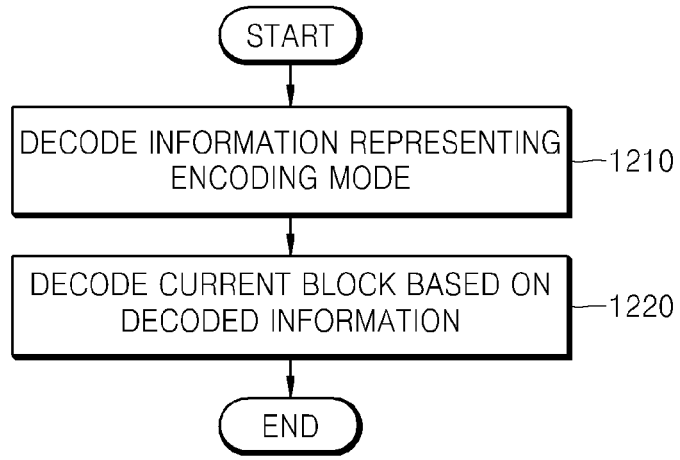
FIG. 12 is a flowchart of an image decoding method according to an exemplary embodiment.

FIG. 12 is a flowchart of an image decoding method according to an exemplary embodiment. Referring to FIG. 12, in operation 1210, the image decoding apparatus 800 or 900 illustrated in FIG. 8 or 9 decodes information representing an encoding mode of a current block, which is included in a bitstream. For example, the image decoding apparatus 800 or 900 decodes information representing whether the current block is encoded in a skip mode, a natural mode, or a graphic mode, by parsing the bitstream.

In operation 1220, the image decoding apparatus 800 or 900 decodes the current block based on the information decoded in operation 1210. If the decoded information represents that the current block is encoded in the skip mode, the image decoding apparatus 800 or 900 restores the current block based on a block that is identical or similar to the current block, e.g., a neighboring block decoded prior to the current block. If the current block is encoded in the skip mode and is an initial block of a current slice, the image decoding apparatus 800 or 900 restores the current block based on pixel values of a virtual block. The decoding of the current block based on the pixel values of the virtual block will be described below with reference to FIGS. 13 through 15.

If the decoded information represents that the current block is encoded in the natural mode or the graphic mode, the image decoding apparatus 800 or 900 restores the current block by inversely performing the encoding operations as, for example, described above with reference to FIGS. 5 and 6A.

Figure 13:
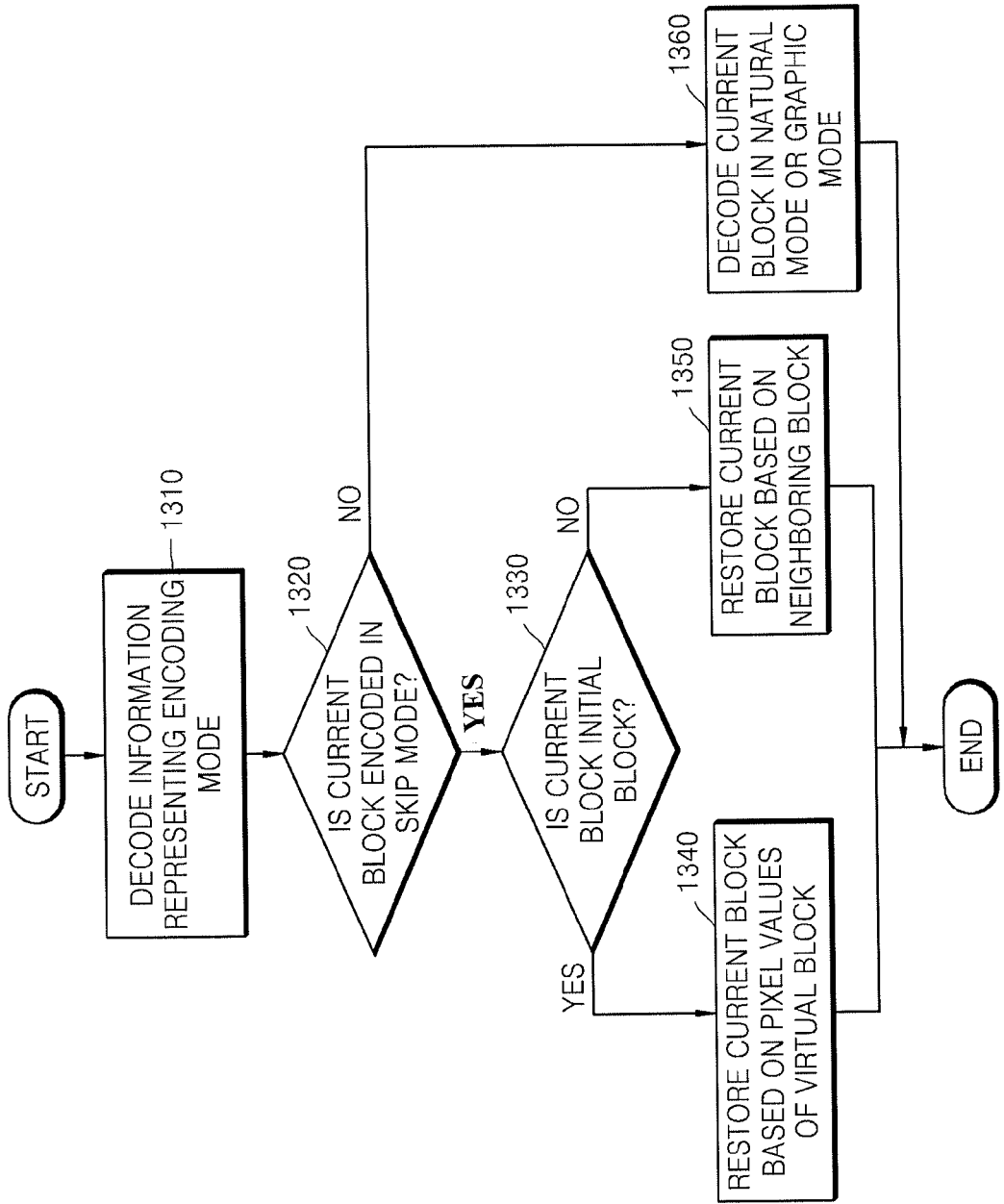
FIG. 13 is a flowchart of an image decoding method according to another exemplary embodiment.

FIG. 13 is a flowchart of an image decoding method according to another exemplary embodiment. Referring to FIG. 13, in operation 1310, the image decoding apparatus 800 or 900 illustrated in FIG. 8 or 9 decodes information representing an encoding mode of a current block, which is included in a bitstream. Operation 1310 may correspond to operation 1210 of FIG. 12.

In operation 1320, the image decoding apparatus 800 or 900 determines whether the current block is encoded in a skip mode by referring to the information representing the encoding mode, which is decoded in operation 1310.

If it is determined that the current block is encoded in the skip mode in operation 1320, the image decoding apparatus 800 or 900 determines whether the current block is an initial block of a current slice in operation 1330.

If it is determined that the current block is the initial block of the current slice in operation 1330, the image decoding apparatus 800 or 900 restores the current block based on pixel values of a virtual block in operation 1340. Also, if the current block is the initial block of the current slice, a neighboring block, which is decoded prior to the current block and is referred to so as to decode the current mode in the skip mode, does not exist. Accordingly, the current block is restored by referring to decoded information about the pixel values of the virtual block. If the pixel values of the virtual block are set to all have the same value and the current block is encoded in the skip mode, the current block is restored by setting the pixel values of the current block to be identical to the same pixel values of the virtual block. The information about the pixel values of the virtual block may be included in a slice header or a block header and may be decoded before performing the method of FIG. 13.

If it is determined that the current block is not the initial block of the current slice in operation 1330, the image decoding apparatus 800 or 900 may restore the current block based on a block identical or similar to the current block, i.e., a neighboring block that is decoded prior to the current block in operation 1350.

Operations 1340 and 1350 will now be described in detail with reference to FIG. 14. FIG. 14 illustrates a syntax of a method of restoring a current block in a skip mode, according to an exemplary embodiment. In particular, FIG. 14 relates to a method of restoring pixel values of each color component in the skip mode, when the current block has a plurality of color components (for example, three or four color components).

Referring to FIG. 14, pixel values of each color component of an initial block are restored by a syntax "image_data[i*64+j]=pix_first_blk_skip[i]." Here, the syntax "pix_first_blk_skip[i]" denotes a pixel value of an i-th color component of a virtual block used to encode the current block in the skip mode.

If the current block is not the initial block, pixel values of each color component are restored by a syntax "image_data[i*64+j]=image_data[(i-unit)*64+j]." The pixel values of each color component of the current block are restored by copying pixel values of each color component of a neighboring block that is decoded prior to the current block.

Referring back to FIG. 13, if it is determined that the current block is not encoded in the skip mode in operation 1320, the image decoding apparatus 800 or 900 decodes the current block in a natural mode or a graphic mode in operation 1360. The current block is restored by inversely performing the encoding operations as, for example, described above with reference to FIGS. 5 and 6A.

Figure 15:
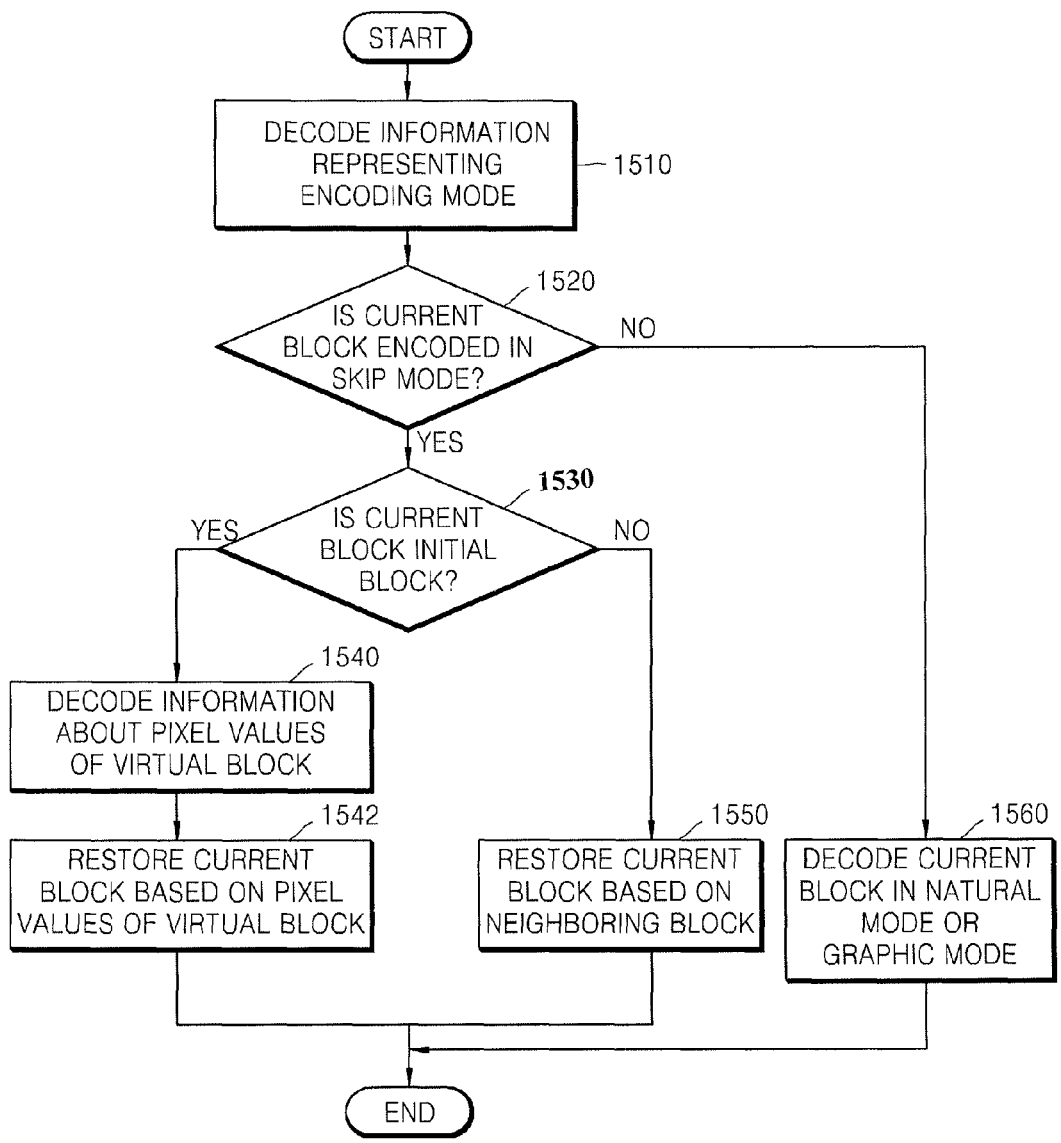
FIG. 15 is a flowchart of an image decoding method according to another exemplary embodiment.

FIG. 15 is a flowchart of an image decoding method according to another exemplary embodiment. Referring to FIG. 15, in operation 1510, the image decoding apparatus 800 or 900 decodes information representing an encoding mode of a current block, which is included in a bitstream. Operation 1510 may correspond to operation 1310 of FIG. 13.

In operation 1520, the image decoding apparatus 800 or 900 determines whether the current block is encoded in a skip mode by referring to the information representing the encoding, decoded in operation 1510. Operation 1520 may correspond to operation 1320 of FIG. 13.

If it is determined that the current block is encoded in the skip mode in operation 1520, the image decoding apparatus 800 or 900 determines whether the current block is an initial block of a current slice in operation 1530. Operation 1530 may correspond to operation 1330 of FIG. 13.

If it is determined that the current block is the initial block of the current slice in operation 1530, the image decoding apparatus 800 or 900 decodes information about pixel values of a virtual block in operation 1540. For example, if the information about the pixel values of the virtual block is inserted into a bitstream, instead of pixel values of the current block, a part of the bitstream assigned to the pixel values of the current block may be parsed and decoded.

In operation 1542, the image decoding apparatus 800 or 900 restores the current block based on the pixel values of the virtual block. Operation 1542 may correspond to operation 1340 of FIG. 13.

If it is determined that the current block is not the initial block of the current slice in operation 1530, the image decoding apparatus 800 or 900 restores the current block based on a block identical or similar to the current block, e.g., a neighboring block that is decoded prior to the current block in operation 1550. Operation 1550 may correspond to operation 1350 of FIG. 13.

If it is determined that the current block is not encoded in the skip mode in operation 1520, the image decoding apparatus 800 or 900 decodes the current block in a natural mode or a graphic mode in operation 1560. Operation 1560 may correspond to operation 1360 of FIG. 13.

While exemplary embodiments have been particularly shown and described with reference to the drawings, it will be understood by one of ordinary skill in the art that various changes in form and details may be made therein without departing from the spirit and scope of the inventive concept as defined by the following claims and their equivalents. An exemplary embodiment can also be embodied as computer readable codes on a computer readable recording medium. The computer readable recording medium is any data storage device that can store data which can be thereafter read by a computer system.

For example, at least one of the image encoding and decoding apparatus illustrated in FIGS. 1, 4, 7, 8, and 9 may include a bus coupled to every unit of the apparatus, at least one processor connected to the bus, and memory connected to the bus to store commands, received messages, and generated messages, and the processor executes the commands.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While exemplary embodiments have been particularly shown and described with reference to the drawings, it will be understood by those of ordinary skill in the art that various changes in form and details may be made therein without departing from the spirit and scope of the present inventive concept as defined by the following claims.

What is claimed is:

1. An image encoding method comprising:
    if a current block of an image is an initial block of a current slice of the image, determining whether a virtual block, in which pixel values are equal to a predetermined value, is identical to the current block; and
    encoding the current block in a first mode from among a plurality of modes, based on a result of the determining,
    wherein the first mode is a skip mode for encoding information representing that the current block is encoded in the skip mode instead of encoding pixel values of the current block, when the current block is identical to the virtual block,
    wherein the plurality of modes comprises:
        the first mode;
        a second mode for encoding the current block based on discrete cosine transformation (DCT); and
        a third mode for encoding the current block based on a plurality of bit planes of pixel values,
    wherein the encoding the current block in the first mode based on the determining comprises encoding the current block in the second mode or the third mode if the current block is not the initial block of the current slice or if the virtual block is not identical to the current block according to the determining,
    wherein each of the current block and the virtual block is an N×N block, and N is greater than or equal to two, and
    wherein each of the current block and the virtual block is smaller than the image.

2. The method of claim 1, wherein the predetermined value is a same value as the pixel values of the current block.

3. The method of claim 2, wherein the encoding comprises encoding information about the predetermined value and inserting the encoded information into a current slice header or a block header of a bitstream.

4. The method of claim 2, wherein the encoding comprises encoding information about the predetermined value and inserting the encoded information into a part of a bitstream assigned to the pixel values of the current block.

5. The method of claim 1, wherein the second mode is a mode for performing the DCT on the pixel values of the current block and encoding the current block in units of bit planes by dividing the current block into a plurality of bit planes from a most significant bit to a least significant bit of coefficients generated as a result of performing the DCT.

6. The method of claim 1, wherein the third mode is a mode for encoding the current block in units of bit planes by dividing the current block into the plurality of bit planes from a most significant bit to a least significant bit of the pixel values of the current block.

7. The method of claim 1, wherein the encoding the current block in the second mode or the third mode comprises:
    encoding the current block in the second mode when the image is a natural image; and
    encoding the current block in the third mode when the image is an artificial image.

8. The method of claim 1, wherein the encoding the current block in the second mode or the third mode comprises:
    encoding the current block in the second mode based on the DCT and encoding the current block in the third mode based on the plurality of bit planes of pixel values;
    comparing the encoded current block encoded in the second mode with the encoded current block encoded in the third mode;
    determining an encoding mode of the current block from among the second mode and the third mode according to the comparing; and
    encoding the current block according to the determined encoding mode.

9. A non-transitory computer-readable record medium having recorded thereon a computer program for executing the method of claim 1.

10. An image decoding method comprising:
    decoding information representing an encoding mode of a current block of an image that is an initial block of a current slice of the image; and
    decoding the current block in a first mode from among a plurality of modes, based on the information representing the encoding mode,
    wherein the first mode is a skip mode for decoding the current block based on a virtual block in which pixel values are equal to a predetermined value,
    wherein the plurality of modes comprises:
        the first mode;
        a second mode for decoding the current block based on discrete cosine transformation (DCT); and
        a third mode for decoding the current block based on a plurality of bit planes of pixel values,
    wherein when the information represents that the encoding mode is not the first mode, the decoding the current block in the first mode based on the information representing the encoding mode comprises decoding the current block in the second mode or the third mode, and
    wherein each of the current block and the virtual block is an N×N block, and N is greater than or equal to two, and wherein each of the current block and the virtual block is smaller than the image.

11. The method of claim 10, wherein the decoding the current block in the first mode comprises:
decoding information about the predetermined value; and
decoding the current block by setting pixel values of the current block to be equal to the predetermined value.

12. The method of claim 11, wherein the information about the predetermined value is inserted into a current slice header or a block header of a bitstream.

13. The method of claim 11, wherein the information about the predetermined value is disposed in a part of a bitstream assigned to the pixel values of the current block.

14. The method of claim 10, wherein the second mode is a mode for decoding a plurality of bit planes from a most significant bit to a least significant bit of DCT coefficients in units of bit planes, and performing inverse DCT on the DCT coefficients generated as a result of the decoding the plurality of bit planes.

15. The method of claim 10, wherein the third mode is a mode for decoding the plurality of bit planes from a most significant bit to a least significant bit of pixel values of the current block in units of bit planes.

16. The method of claim 10, wherein decoding the current block in the second mode or the third mode comprises:
decoding the current block in the second mode when the image is a natural image; and
decoding the current block in the third mode when the image is an artificial image.

17. A non-transitory computer-readable record medium having recorded thereon a computer program for executing the method of claim 10.

18. An image encoding apparatus comprising:
a mode determination unit which, if a current block of an image is an initial block of a current slice of the image, determines whether a virtual block, in which pixel values are equal to a predetermined value, is identical to the current block; and
an encoder which encodes the current block in a first mode from among a plurality of modes, based on a result of the determining,
wherein the first mode is a skip mode for encoding information representing that the current block is encoded in the skip mode, instead of encoding pixel values of the current block, when the current block is identical to the virtual block,
wherein the plurality of modes comprises:
the first mode;
a second mode for encoding the current block based on discrete cosine transformation (DCT); and
a third mode for encoding the current block based on a plurality of bit planes of pixel values,
wherein the encoding the current block in the first mode based on the determining comprises encoding the current block in the second mode or the third mode if the current block is not the initial block of the current slice or if the virtual block is not identical to the current block according to the determining, and
wherein each of the current block and the virtual block is an N×N block, and N is greater than or equal to two, and
wherein each of the current block and the virtual block is smaller than the image.

19. The apparatus of claim 18, wherein the predetermined value is a same value as the pixel values of the current block.

20. An image decoding apparatus comprising:
a mode information decoder which decodes information representing an encoding mode of a current block of an image that is an initial block of a current slice of the image; and
a decoder which decodes the current block in a first mode from among a plurality of modes, based on the information representing the encoding mode,
wherein the first mode is a skip mode for decoding the current block based on a virtual block in which pixel values are equal to a predetermined value,
wherein the plurality of modes comprises:
the first mode;
a second mode for decoding the current block based on discrete cosine transformation (DCT); and
a third mode for decoding the current block based on a plurality of bit planes of pixel values,
wherein when the information represents that the encoding mode is not the first mode, the decoding the current block in the first mode based on the information representing the encoding mode comprises decoding the current block in the second mode or the third mode, and
wherein each of the current block and the virtual block is an N×N block, and N is greater than or equal to two, and
wherein each of the current block and the virtual block is smaller than the image.

21. The apparatus of claim 20, wherein the decoder decodes information about the predetermined value, and decodes the current block in the first mode by setting pixel values of the current block to be equal to the predetermined value.

* * * * *